Patented Sept. 1, 1953

2,650,928

UNITED STATES PATENT OFFICE 2,650,928

PROCESS FOR THE PREPARATION OF PURE BROMO-α-AMINO ANTHRAQUINONES

Guido R. Genta, Hillside, N. J., assignor to General Aniline & Film Corporation, New York, N. Y., a corporation of Delaware No Drawing. Application December 19, 1950, Serial No. 201,699

8 Claims. (Cl. 260—381)

The present invention pertains to a process for the preparation of brominated α-amino anthraquinones in quantitative yields and in a high state of purity.

The halogenation of α-amino anthraquinones has been carried out by a number of different methods, while utilizing different solvent diluents.

Thus, German Patent 160,169 effects halogenation in the presence of glacial acetic acid as the solvent, whereas Karl Lauer in J. prakt. Chem. 136, pages 1 to 4, recommends that the halogenation be effected with nitrobenzene as the solvent.

It is known that these direct methods of halogenation yield mixtures of different isomers, thus requiring a final purification such as a crystallization from a different solvent medium. For example, Karl Lauer, in the above publication, states that the bromination of α-amino anthraquinone in nitrobenzene yields two isomers in the following proportions:

|   | Per cent |
|---|---|
| 1-amino-2-bromoanthraquinone | 62.5 |
| 1-amino-4-bromoanthraquinone | 37.5 |

This tendency to isomer formation by direct halogenation prompted investigators to use indirect methods for the preparation of α-amino bromo anthraquinones in a pure form. One method devised toward this end was based upon the dehalogenation of 1-amino-2,4-dibromoanthraquinone by the action of reducing agents, according to the following scheme:

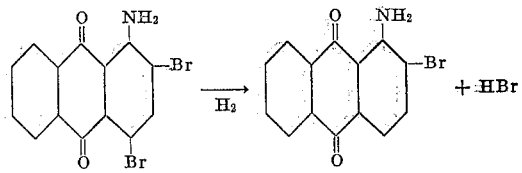

German Patent 236,604 describes the use as such reducing agents of iron or zinc in glacial acetic acid.

Berichte, vol. 49, page 2166 on the other hand proposes the use of aniline in sulfuric acid.

These procedures, however, yield a 1-amino-2-bromo anthraquinone of very low purity, and it is necessary to recrystallize it several times before the theoretical melting point is obtained.

Still another procedure which has been devised in an effort to obtain products free from isomers is described in German Patent 261,270. According to this patent, 1-amino-2-bromo anthraquinone is formed through a halogen exchange between 1-amino-2,4-dibromo anthraquinone and 1-amino anthraquinone, according to the following equation:

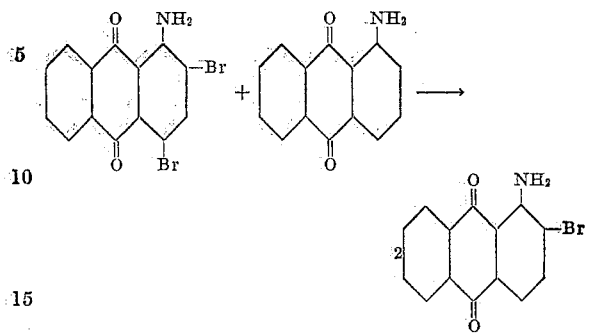

This procedure, however, is mainly of academic interest for the reason that the crude product obtained requires acid fractionation, as a consequence of which the yields drop rapidly.

I have now discovered that α-amino anthraquinones may be brominated with the selective addition of the bromine in ortho position to an amino group and while obtaining the brominated derivative in practically quantitative yields. This result is achieved by effecting bromination of the α-amino anthraquinone while dissolved in a melt consisting of an aluminum halide, an alkali metal halide and, preferably, a tertiary organic base.

The preparation of α-amino bromo anthraquinones by such procedure constitutes the purposes and objects of the present invention.

The melt in which the bromination of the α-amino anthraquinones is effected contains, as stated, an anhydrous aluminum halide such as aluminum chloride or aluminum bromide and an alkali metal halide such as sodium chloride, sodium bromide, potassium chloride, potassium bromide, lithium chloride, lithium bromide, and the like.

Preferably, however, the melt should contain a tertiary base which is liquid at a temperature ranging from about 80 to 125° C. The provision of the tertiary base assures the formation of a thin melt which has the advantage that it minimizes loss of bromine by permitting the addition of bromine at relatively low temperatures and by insuring thorough mixing of the fluid mass during bromination.

Examples of tertiary bases which may be employed are pyridine, α-picoline, quinoline, dimethylaniline, diethylaniline, trimethylaniline, triethylamine, and the like.

The relative proportions of the aluminum halide on the one hand and the alkali metal halide on the other hand may vary, so long as the proportions insure the formation of a melt at the bromination temperature. Generally, however, there will be used about one part by weight of the alkali metal halide to each 5 to 10 parts by weight of the aluminum halide.

The tertiary organic base is added to insure a thin melt, and hence the proportion selected will be such as to achieve this end. I have found that the use of .05 to .5 part by weight of the base to one part by weight of the aluminum halide will give satisfactory results.

My process is effective on any α-amino anthraquinone, so long as the positions ortho to the amino group are unsubstituted. Examples of α-amino anthraquinones which may be employed are 1-amino-anthraquinone; 1,5-diamino anthraquinone; 1,8-diamino anthraquinone, and 1,4-diamino anthraquinone. In each case the bromine adds selectively to the ortho or ortho positions to the amino or amino groups without isomer formation.

My process is effected by forming a melt of the aluminum halide and alkali metal chloride, preferably with the tertiary base, heating the melt until it becomes uniform, and dissolving the α-amino anthraquinone therein. The temperature is then adjusted to between 80 to 100° C., and the bromine added slowly to the melt. After bromination is completed, the reaction mixture is worked up by drowning the melt and filtering the resulting mixture. In this way, the desired product is obtained in a highly purified state and in quantitative yields, and without the necessity of the purification essential in the prior art methods. My procedure, accordingly, makes available for the first time, valuable intermediates for important vat dyes such as those of the anthraquinone azine type in a very economical manner.

The following examples will further illustrate the invention, but it is to be understood that the invention is not restricted thereto. The parts are by weight, unless otherwise stated.

*Example I*

A mixture of 770 grams of anhydrous AlCl₃ and 115 grams of dry sodium chloride is added slowly to 77 cc. of pyridine.

By cooling, the temperature is kept below 100° C. The melt obtained is heated to 125° C. until it is uniform. It is then cooled to 100° C. and 112 grams of 1-amino anthraquinone are added in about ½ hour. The temperature is adjusted to 85–90° C. and 75 grams of bromine are added dropwise over 1½–2 hours. The mixture is agitated at 100° C. for 4 hours. After drowning in 4000 cc. of ice water and 200 cc. of hydrochloric acid of 20° Bé., the melt is boiled, filtered and washed until it is acid free.

The dried product is a light, brownish yellow powder having a melting point of 178–179° (literature 181°). Yield 150 grams (theory 152). It consists of practically pure 1-amino-2-bromoanthraquinone having a bromine content of 26%.

*Example II*

The procedure is the same as in Example I, excepting that the aluminum chloride is replaced by aluminum bromide and the sodium chloride by sodium bromide. The results obtained are substantially the same as those of Example I.

*Example III*

The procedure is the same as in Example I, excepting that the pyridine is replaced by an equivalent quantity of α-picoline. The results are quite similar to those of Example I.

*Example IV*

A mixture of 600 grams of anhydrous AlCl₃ and 90 grams of dry sodium chloride is charged to 60 cc. of pyridine while keeping the temperature below 100° C. The melt obtained is heated to 125° C. and 100 grams of 1.5 diamino anthraquinone (obtained by amination of 1.5 disulfo anthraquinone) are slowly added and the mixture agitated until homogeneous. The mass is cooled to 85 to 90° C. and 130 grams of bromine are added dropwise.

The melt is agitated at 100–105° C. for 4 hours and is then drowned in ice water containing hydrochloric acid. The working up is done as in Example I. The dry material is a light brown powder having a melting point of 268–270° (literature 274) and consists of 1,5-diamino-2,6-dibromoanthraquinone in a form of such purity that it can be used directly as an intermediate for valuable vat dyestuffs. The yield is 162 grams and the Br content is 38.5%.

*Example V*

The procedure is the same as in Example IV, excepting that the 1,5-diaminoanthraquinone is replaced by 1,8 - diaminoanthraquinone. The product obtained is 1,8-diamino-2,7-dibromoanthraquinone. The yields are practically quantitative.

Various modifications of the invention will occur to persons skilled in the art. Thus it is evident that in lieu of using pyridine or α-picoline, I may use any of the tertiary organic bases previously referred to. The same is true with respect to the alkali metal halide component of the melt. I, therefore, do not intend to be limited in the patent granted, except as necessitated by the prior art and the appended claims.

I claim:

1. The process of producing α-amino bromo anthraquinones containing the bromine ortho to an amino group in a practically quantitative yield and in a high state of purity which comprises brominating an α-amino anthraquinone containing a free position ortho to an amino group by dissolving the α-amino anthraquinone in a fused melt of an aluminum halide and an alkali metal halide and adding bromine thereto.

2. The process as defined in claim 1 wherein the melt contains a tertiary organic base which is liquid at a temperature ranging from about 80 to 125° C., but only in such amount as to insure the provision of a thin melt.

3. The process as defined in claim 1 wherein bromination is effected at a temperature of about 80 to 110° C.

4. The process of producing 1-amino-2-bromo anthraquinone in quantitative yields in a high state of purity which comprises forming a fused melt of anhydrous aluminum chloride, sodium chloride and pyridine the amount of pyridine being only that sufficient to insure a thin melt, adding α-amino anthraquinone thereto at a temperature of about 100° C. and slowly adding bromine to the melt at a temperature ranging from about 85 to 90° C.

5. The process of producing α-aminoanthraquinones containing bromine ortho to an amino group in a practically quantitative yield and in a high state of purity, which comprises brominating an α-aminoanthraquinone containing a free position ortho to an amine group by dissolving the α-aminothraquinone in a fused melt of an aluminum halide, an alkali metal halide and a tertiary organic base which is liquid at a temperature ranging from 80 to 125° C. and slowly adding bromine to the melt, the quantity of the tertiary organic base in said melt ranging from about .05 to .5 part by weight of the base to 1 part by weight of the aluminum halide.

6. The process as defined in claim 5 wherein the aluminum halide is aluminum chloride, the alkali halide is sodium chloride and the tertiary organic base is pyridine.

7. The process of producing 1,5-diamino-2,6-dibromoanthraquinone which comprises forming a fused melt of anhydrous aluminum chloride, sodium chloride and pyridine, the amount of pyridine being only that sufficient to form a thin melt, adding 1,5-diaminoanthraquinone thereto and slowly adding bromine to the melt at a temperature ranging from about 85 to 90° C.

8. The process of producing 1,8-diamino-2,7-dibromoanthraquinone which comprises forming a fused melt of anhydrous aluminum chloride, sodium chloride and pyridine, the amount of pyridine being only that sufficient to form a thin melt, adding 1,8-diaminoanthraquinone thereto and slowly adding bromine to the melt at a temperature ranging from about 85 to 90° C.

GUIDO R. GENTA.

References Cited in the file of this patent

UNITED STATES PATENTS

| Number | Name | Date |
|---|---|---|
| 1,982,313 | Kunz et al. | Nov. 27, 1934 |
| 1,986,798 | Dettwyler | Jan. 8, 1935 |

OTHER REFERENCES

Thomas: Anhydrous Aluminum Chlorides in Organic Chemistry, Reinhold Publishing Corp., N. Y. C., 141, page 612.